United States Patent
Li et al.

(10) Patent No.: US 7,542,450 B2
(45) Date of Patent: Jun. 2, 2009

(54) GAIN CONTROL METHOD FOR THE INITIAL CELL SEARCHING IN TD-SCDMA MOBILE COMMUNICATION SYSTEM

(75) Inventors: Shihe Li, Beijing (CN); Wensheng Xu, Beijing (CN)

(73) Assignee: Da Tang Mobile Communications Equipment Co., Ltd., Beijing (CN)

( * ) Notice: Subject to any disclaimer, the term of this patent is extended or adjusted under 35 U.S.C. 154(b) by 320 days.

(21) Appl. No.: 10/565,764

(22) PCT Filed: Jul. 28, 2004

(86) PCT No.: PCT/CN2004/000878

§ 371 (c)(1),
(2), (4) Date: Jul. 14, 2006

(87) PCT Pub. No.: WO2005/015920

PCT Pub. Date: Feb. 17, 2005

(65) Prior Publication Data

US 2007/0189229 A1    Aug. 16, 2007

(30) Foreign Application Priority Data

Aug. 6, 2003 (CN) .................. 03 1 49787

(51) Int. Cl.
*H04B 7/216* (2006.01)
*H04W 4/00* (2006.01)
(52) U.S. Cl. .................. 370/335; 455/434; 455/525
(58) Field of Classification Search .................. 370/335; 375/354, 149; 455/434, 525, 435.1–435.3
See application file for complete search history.

(56) References Cited

U.S. PATENT DOCUMENTS

| 5,422,648 A | 6/1995 | Uematsu et al. |
| 5,917,865 A | 6/1999 | Kopmeiners et al. |
| 7,308,258 B2 * | 12/2007 | Demir et al. .................. 455/434 |
| 2003/0031238 A1 * | 2/2003 | Li et al. .................. 375/147 |

FOREIGN PATENT DOCUMENTS

CN            1378357            11/2002

* cited by examiner

*Primary Examiner*—Vincent P Harper
*Assistant Examiner*—Omoniyi A Obayanju
(74) *Attorney, Agent, or Firm*—Merchant & Gould P.C.

(57) ABSTRACT

The present invention discloses a gain control method used at the initial cell searching by the user terminal in TD-SCDMA mobile communication system. At each carrier frequency, the user terminal firstly receives and records the data of a plurality of subframes transmitted from a base station when the receiver is set at the maximum gain; searchs the DwPTS positions by using the time window decision method; performs the succeeding steps of the initial cell searching subsequently when the DwPTS positions can be obtained; judges whether the receiver is in saturation when the DwPTS positions can not be obtained; decreases the receiver gain by a large step and receives and records the data of a plurality of subframes transmitted from the base station if the receiver is in saturation; and determines that there is no base station for working at the present carrier frequency if the receiver is not in saturation. The above initial cell searching procedures are repeated until the receiver is not in saturation any more. The ADC of user terminals can finish the initial cell searching under the condition of less dynamic range by using the present invention.

7 Claims, 4 Drawing Sheets

US 7,542,450 B2

GAIN CONTROL METHOD FOR THE INITIAL CELL SEARCHING IN TD-SCDMA MOBILE COMMUNICATION SYSTEM

FIELD OF THE INVENTION

The present invention relates generally to a mobile communication technology, and more particularly to a gain control method for the initial cell searching in a TD-SCDMA mobile communication system.

BACKGROUND OF THE INVENTION

The cell searching has to be performed whenever all user terminals in the mobile communication system are powered on or the cell is re-selected. Accordingly, a method for cell searching is provided in the standarded of Third Generation Mobile Communication System.

Take TD-SCDMA system as an example in TDD (Time Division Duplex) system to describe its frame structure before introducing the cell searching method. FIG. 1 is a schematic diagram illustrating the frame structure in TD-SCDMA system and the cell searching therein. A TD-SCDMA signal is composed of periodic time units on the basis of time. A basic time unit is regarded as a "wireless frame" (a frame) of 10 ms in length; each "wireless frame" can be divided into two subframes of 5 ms in length; each subframe is further divided into seven regular time slots TS0-TS6 and three special time slots located between TS0 and TS1, wherein, the traffic is transferred in the regular time slots and three special time slots include DwPTS (Downlink Pilot Time Slot), UpPTS (uplink Pilot Time Slot) and the Guard band (G). According to TD-SCDMA standarded, TS0 is usually designated as the Downlink direction, and TS1 is usually designated as the Uplink direction.

The cell searching procedure comprises steps as follows: firstly, the data of one subframe is received at the working carrier frequency and performing AGC (Automatic Gain Control) is immediately followed, so that the maximum level of the signal received within the time of the subframe (T=0 ms to T=5 ms) will not cause saturation of the receiver (located between the minimum receiving level and the saturation level of the receiver as shown in the figure); secondly, the DwPTS position is acquired by detecting a sliding time window point-by-point, e.g., the arrival time to as shown in the figure, based on the structure of the TD-SCDMA frame having no transmission power in the guard time before and after DwPTS, and the downlink synchronization and carrier tracking according to the timing of said DwPTS are acquired; finally, BCCH (Broadcast Control Channel) information is received and read in TS0 time slot until the cell searching is completed.

The time window decision method can be adopted to acquire the DwPTS position by detecting a sliding time window point-by-point. The time window decision method includes: to determine the length of the sliding time window as eight symbols based on the feature that the DwPTS code length is fixed as four symbols, and to judge the DwPTS position according to the criterion that the levels of the four middle symbols are higher than that of the two symbols at two sides thereof.

In practical user terminals, the dynamic range of the receiver is limited, therefore, the receiver usually uses the automatic gain control technology. As the cell searching begins, the receiver performs the automatic gain control immediately after receiving a subframe data to ensure that the maximum level of signal (including interference) in the received subframe will not cause saturation of the receiver. In FIG. 1, the vertical line areas represent the level of the received downlink signal from the base station, and the horizontal line areas represent the level of the received uplink signal of other working user terminals.

FDD (Frequency Division Duplexing) system adopts different working carrier frequencies in receiving and transmitting, and TDD (Time Division Duplexing) system only uses one carrier frequency, i.e., a same carrier frequency is adopted in receiving and transmitting. The normal AGC manner is adopted to ensure that the level of the signal in the received subframe at the terminal does not cause saturation of the receiver as the automatic gain control is performed immediately, which, however, will not only make the cell initial searching difficult but also leadfailure of it when the following situation: the user terminal performing the cell searching will receive not only the downlink signal from the base station but also the uplink signal of other working user terminals, what is more, if the user terminal locates around the border of the cell which adopts a plurality of same carrier frequencies for working, it will also receive the downlink signal of the base station in neighbouring cells as well as the uplink signal of the working user terminals in said neighbouring cells; if one or more user terminals in the vicinity of the user terminal performing the cell searching are calling, and their working frequencies are same, the uplink signal from the user terminal may be far higher than the downlink signal from the base station. The presence of the interference makes the cell searching more difficult in TDD system.

To solve the above problems, the common way is adopted to increase the receiving dynamic range of the receiver nowadays, and ADC (Anolog-to-Digital Converter) with more bits must be used accordingly, which leads a high cost of the device. Moreover, the working voltage of the user terminal is very low, the ADC bits being used are difficult to exceed ten bits, and the dynamic range is difficult to exceed 60 dB. Therefore, it is impossible to realize the object of increasing the desired dynamic range of the receiver.

In a practical mobile communication network, the AGC range of the receiver at TD-SCDMA user terminal can exceed 80 dB, but it is only 60 dB at a certain gain (assuming using ADC with 10 bit accuracy). Several cases are hereinafter described in conjunction with FIG. 2 to illustrate the problems that occur in the initial cell searching when adopting said normal automatic gain control method.

FIG. 2A shows a typical case. In a subframe (5 ms), the user obtains the downlink signal mainly from the base station which is indicated by the vertical line areas, and the signal of other working users is very low. A good receiving effect can be obtained and the initial cell searching can be realized easily once the aforementioned normal automatic gain control technology is used. The block area indicates the thermal noise level as shown in FIG. 2.

FIG. 2B shows a case that a user is located far from the base station and another working user is nearby. When another working user terminal (indicated by the horizontal line area in the figure) exists in the vicinity of a user (indicated by the vertical line area), and the signal level of said another working user terminal may reach −30 dB or more, the gain control is adjusted immediately to be capable of receiving the signal level of the subframe (5 ms) normally not to lead saturation of the receiver if the normal AGC technology is employed. Meanwhile, the signal (DwPTS in the figure) is lower than the noise (ADC quantification noise level indicated by the shadow in the figure) due to the limitation of the ADC sampling accuracy, which leads failure of the initial cell searching.

FIG. 2C shows a case that a user locates at the edge of the cell and there are interferences from neighbouring cells. although there is no interference of neighbouring users, the interference from neighbouring cells is severe when the user locates at the edge of a cell, and SNR is very low. The base stations in neighbouring cells are synchronized, so the present positions of DwPTS of the subframes in respective cells are adjacent to each other, e.g., DwPTS in different cells as shown in the figure. However, the increase of the width of DwPTS received by the user is not large, and the feature that both guards of DwPTS are still exists. Therefore, the cell searching is difficult to be carried our, but can be realized when adopting the normal AGC technology.

The last possible case is the combination by those shown in FIG. 2B and FIG. 2C. For the same reason as shown in FIG. 2B the initial cell searching will definitely be a failure.

In conclusion, when the initial cell searching is performed, the user terminal performs the automatic gain control immediately when receiving a subframe signal, therefore, it is difficult to realize the initial cell searching in the case of other working user terminals being in the vicinity of said user terminal, which may even lead failure of the cell searching.

SUMMARY OF THE INVENTION

The object of the present invention is to design a gain control method for the initial cell searching in TD-SCDMA mobile communication system, and the gain control method is used for the initial cell searching at the user terminal to solve the problems that the initial cell searching is difficult to be performed in the part of the background description as shown in FIG. 2, and to complete the initial cell searching rapidly under the condition of limited dynamic range by using the user terminal ADC.

The technical solution to realize the object of the present invention is a gain control method for the initial cell searching in TD-SCDMA mobile communication system, said gain control method comprising:

Step A: the user terminal receiving data in the maximum receiving gain at the selected carrier frequency;

Step B: recording the received data of a plurality of subframes;

Step C: determining the DwPTS position of each received subframe by using the time window decision method;

Step D: performing the succeeding procedure of the initial cell searching and returning to execute Step A subsequently when the DwPTS positions of the most received subframes can be determined, and executing Step E when the DwPTS positions of the most received subframes can not be determined; and Step E: judging whether the receiver is in saturation, wherein, returning to execute Step A subsequently when the receiver is not in saturation, and decreasing the receiving gain by a step length and returning to execute Step B subsequently when the receiver is in saturation.

After the procedure returning to execute Step A subsequently in Step D and Step E, Step A re-selects another carrier frequency from all possible carrier frequencies until every possible carrier frequency is selected and then ends the initial cell searching.

Step D judges whether the DwPTS positions whose number exceeds half of the total number of DwPTS positions in the received subframes are determined so as to determine that the DwPTS positions of the most received subframes can be determined, and judges whether the DwPTS positions whose number exceeds half of the total number of DwPTS positions in the received subframes are not determined so as to determine that the DwPTS positions of the most received subframes can not be determined.

Said DwPTS positions whose number exceeds half of the total number of DwPTS positions in the received subframes are determined continuously or at intervals.

In Step D, said determined DwPTS positions whose number exceeds half of the total number of DwPTS positions in the received subframes are considered as the DwPTS positions of subframes.

In Step E, if the receiver is not judged as in saturation and the received signal is environmental interference, there is no base station for working at present carrier frequency.

In Step E, the receiving gain is decreased by a step length ranging from 6 dB to 24 dB.

The present invention is applicable to TD-SCDMA mobile communication system, an relates to a gain control method being used for the initial cell searching at the user terminal. When the user terminal begins with the initial cell searching, the receiver gain is set to be maximum without considering whether the receiver is in saturation; the received data of a plurality of subframes are recorded, then the DwPTS positions of respective subframe are determined using the time window decision method based on the structure feature of the TD-SCDMA system frame; the receiver gain is decreased by a larger step length when acknowledging that the receiver is in saturation and the DwPTS positions can not be obtained; and the data of a plurality of subframes are recorded continuously in every cycle, and the receiver gain is decreased gradually until the receiver is not in saturation any more. The final result after the procedure may be that the DwPTS position is determined for every possible carrier frequency based on the structure of the TD-SCDMA system frame; or no base station exists for being accessed on certain carrier frequency.

The method of the present invention is implemented repeatedly on every possible carrier frequency, and finally completes the initial cell searching.

The method of the present invention can greatly enhance the success rate of the initial cell searching of the user terminal. The ADC of user terminals can complete the initial cell searching under the condition of limited dynamic range, so the bit demand for ADC can be lowered, i.e., decreasing the device cost. Therefore, the problem that the initial cell searching is hard to be implemented when another working terminal exists in the vicinity of a user terminal can be solved.

DETAILED DESCRIPTION OF THE INVENTION

The present invention are hereinafter described in conjunction with the drawings.

Figure 1:
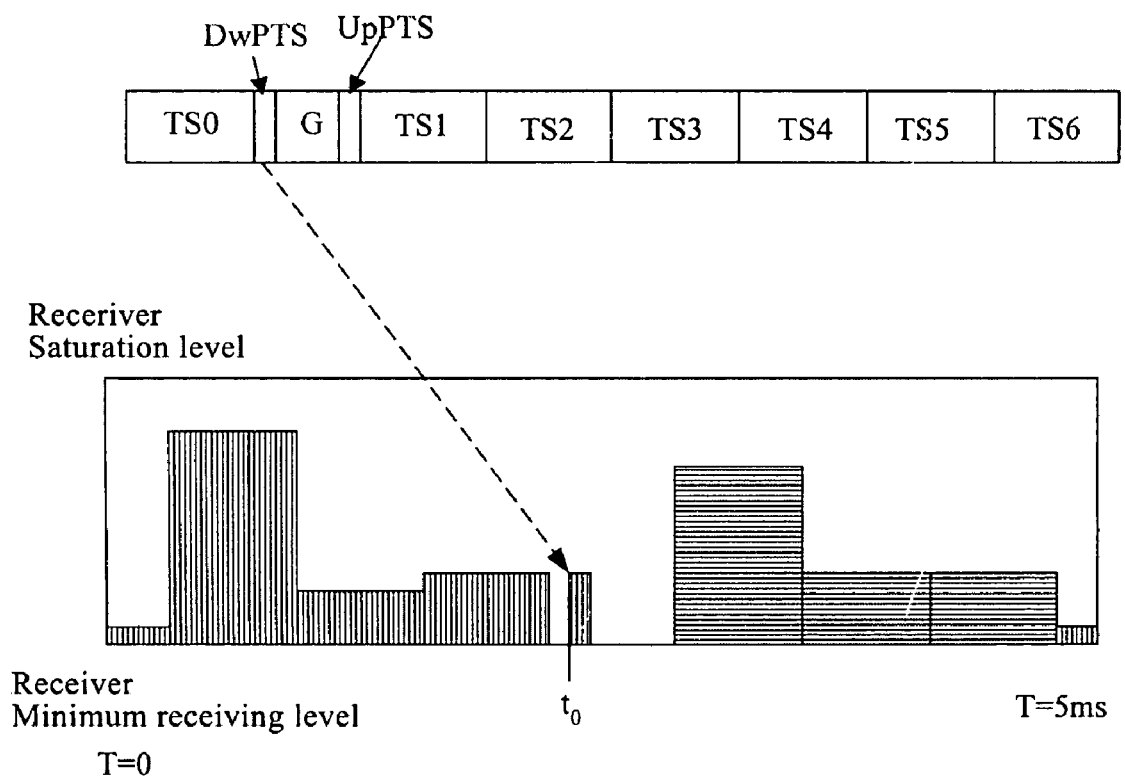
FIG. 1 is a schematic diagram illustrating the frame structure and the cell searching in TD-SCDMA mobile communication system.
Figure 2A:
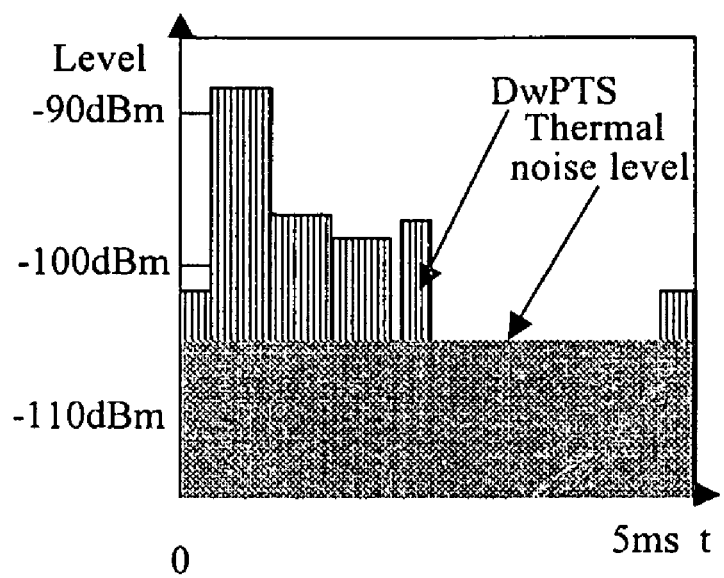
FIG. 2 is a schematic diagram illustrating several cases of a subframe signal received at the initial cell searching comprising a typical case as shown in FIG. 2A, a case that a user is located far from the base station and another working user is nearby as shown in FIG. 2B, and a case that a user locates at the edge of the cell and there are interferences from neighbouring cells as shown in FIG. 2C.
Figure 2B:
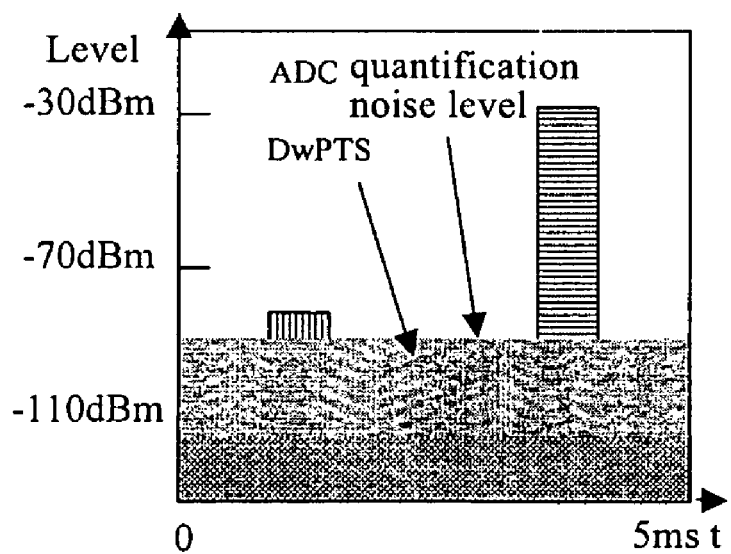
Figure 2C:
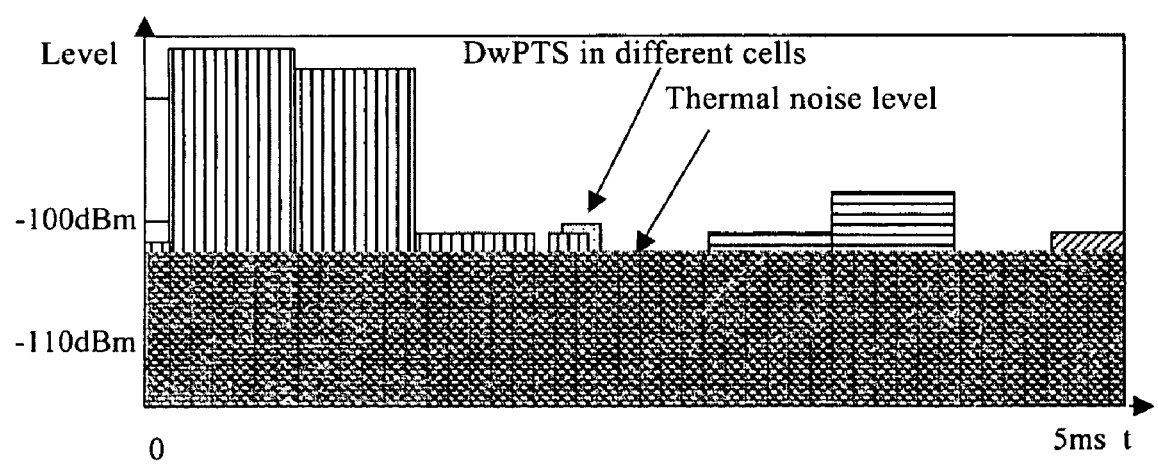

In TD-SCDMA system, its frame structure is designed with special downlink pilot time slot (DwPTS). As shown in FIG. 1, there is not any interference from the cell or the sector but from neighbouring cells or another mobile communication system in said time slot and its neighbouring time instead. In other words, the user terminal can receive the downlink pilot signal more accurately and by which the initial cell searching is realized in said DwPTS time slot. Furthermore, the level of said downlink pilot signal is equivalent to or higher than that on BCCH, which is one of important characteristics of the TD-SCDMA standard.

The present invention realizes simply and effectively the gain control when TD-SCDMA system terminal performs the initial cell searching by said characteristics. The method disclosed in the present invention can solve basically the problems occurred in the initial cell searching.

Figure 3:
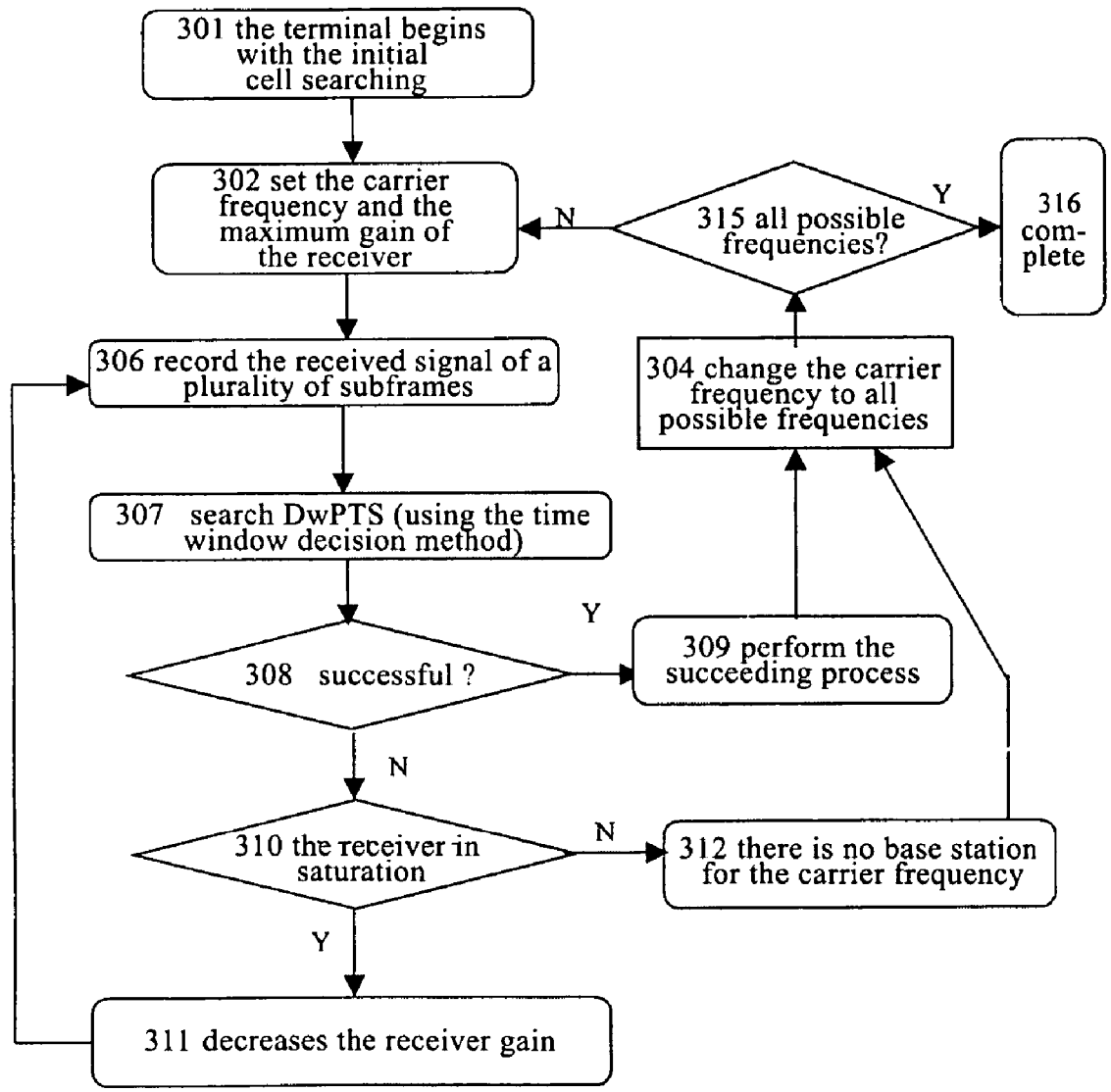
FIG. 3 is a flowing chart illustrating the gain control procedure at the cell searching.

With reference to FIG. 3, the gain control method adopted at the initial cell searching is illustrated.

The user terminal begins with the initial cell searching (Step 301); sets the original carrier frequency and the maximum gain of the receiver (Step 302); receives and records signals of a plurality of subframe by the original carrier frequency and the maximum gain of the receiver (Step 306); and searchs the DwPTS positions of a plurality of subframes using the aforementioned time window decision method according to the structure feature of TD-SCDMA frame, and then different results are produced (Step 307 and 308) based on the search of the DwPTS positions of a plurality of subframes:

The first result is to perform the succeeding procedure of the initial cell searching continuously, including receiving and reading the BCCH information in TS0 time slot, after judging that the DwPTS positions of a plurality of subframes have been found and finished the initial cell searching (Step 309);

The second result is to further judge that the received signal does not cause the receiver to be in saturation (Step 310) when judging that the DwPTS positions of a plurality of subframes have not been searched, therefore, it can be determined that the level of the received signal is very low or the received signal is environmental interference; and there is no base station for working at the present carrier frequency, then, the carrier frequency is changed, the maximum gain of the receiver is adopted(Step 304), and next initial cell searching is re-performed (Step 302);

The third result is to decrease the receiving gain of the receiver by a large step length (Step 311), which normally can be selected from 6 dB to 24 dB, e.g., 6, 9, 12, 24 dB, in the case that the DwPTS positions of respective subframes can not be obtained and the received signal level causes the receiver to be in saturation, and then to re-receive and record the received signals of a plurality of subframes at the present carrier frequency (Step 306).

The receiver gain is decreased by a step length once the received signal level causes the receiver to be in saturation, i.e., the data received within a part of time reaches the highest bit in the ADC dynamic range (the part of time is a time period within 5 ms, which can be smaller than 1 ms or several ms). Then, the signals of several subframes at the present carrier frequency are re-received and recorded, and the initial cell searching is re-performed (Step 307). The procedure is repeated for several times until the receiver is not saturated. The DwPTS positions may be searched successfully in the repeating procedures, and the process goes into the succeeding procedure (Step 309), but an instance may occur that the DwPTS positions still can not be obtained, therefore, it is determined that there is no base station for working at the present carrier frequency (Step 312). Then, the present carrier frequency is changed (Step 304), and the initial cell searching is re-performed (Step 302) wherein, the present carrier frequency is changed from all possible carrier frequencies. The initial cell searching procedure is completed until the above procedure has been executed at all carrier frequencies (Step 315 and 316).

The initial cell searching procedure of the terminal can be completed effectively by such a control of the receiver gain. The cell searching is executed at all possible carrier frequencies and the cell searching in all cells are completed finally.

It should be noted that the received signal of a plurality of subframes are recorded continuously or at intervals in each initial cell searching (Step 306), and the DwPTS positions are searched for the signal of each subframe in the method of the present invention. The condition that the DwPTS positions are found in the most subframes, e.g., more than half of subframes, is considered as a criterion for obtaining the DwPTS positions in Step 308, and the DwPTS positions found in more than half of subframes are considered as the DwPTS positions. In this manner, the present invention can overcome the influence of fast fading and improve the success rate of the initial cell searching completed in the case of SNR being very low (approaching 0 dB).

The method of the present invention applied to TD-SCDMA mobile communication system is a gain control method used at the initial cell searching for the user terminal. At each carrier frequency, the receiver is set at the maximum receiving gain to receive and record the received data of a plurality of subframes; the time window decision method is used to search the DwPTS positions of a plurality of subframes transmitted by the base station, and the receiver gain is decreased by a large step length when determined as the receiver is in saturation and the DwPTS positions can not be obtained; and the receiver gain is decreased gradually when repeating above cell searching procedures until the receiver is not in saturation any more. The ADC of user terminals can complete the initial cell searching under the condition of less dynamicrange by using the present invention.

What is claimed is:

1. A gain control method for an initial cell searching in TD-SCDMA mobile communication system, said gain control method comprising:

Step A: a user terminal receiving data in the maximum receiving gain at a selected carrier frequency;

Step B: recording the received data of a plurality of subframes;

Step C: determining a DwPTS position of each received subframe by using a time window decision method;

Step D: performing a succeeding procedure of the initial cell searching and returning to execute Step A subsequently when the DwPTS positions of the most received subframes can be determined, and executing Step E when the DwPTS positions of the most received subframes can not be determined; and Step E: judging whether a receiver is in saturation, wherein, returning to execute Step A subsequently when the receiver is not in saturation, and decreasing the receiving gain by a step length and returning to execute Step B subsequently when the receiver is in saturation.

2. A gain control method for the initial cell searching in TD-SCDMA mobile communication system as defined in claim 1, wherein after said method returning to execute Step A subsequently in Step D and Step E, Step A re-selects another carrier frequency from all possible carrier frequencies until each possible carrier frequency is selected and then ends the initial cell searching.

3. A gain control method for the initial cell searching in TD-SCDMA mobile communication system as defined in claim 1, wherein in Step D, judging whether the DwPTS positions whose number exceeds half of the total number of DwPTS positions in the received subframes are determined so as to determine that the DwPTS positions of the most received subframes can be determined; and in Step D, judging whether the DwPTS positions whose number exceeds half of the total number of DwPTS positions in the received subframes are not determined so as to determine that the DwPTS positions of the most received subframes can not be determined.

4. A gain control method for the initial cell searching in TD-SCDMA mobile communication system as defined in claim 3, wherein said DwPTS positions whose number exceeds half of the total number of DwPTS positions in the received subframes are determined continuously or at intervals.

5. A gain control method for the initial cell searching in TD-SCDMA mobile communication system as defined in claim 1, wherein in Step D, said determined DwPTS positions whose number exceeds half of the total number of DwPTS positions in the received subframes are considered as the DwPTS positions of subframes.

6. A gain control method for the initial cell searching in TD-SCDMA mobile communication system as defined in claim 1, wherein in Step E, if the receiver is judged not to be in saturation and the received signal is environmental interference, there is no base station for working at present carrier frequency.

7. A gain control method for the initial cell searching in TD-SCDMA mobile communication system as defined in claim 1, wherein in Step E, the receiving gain is decreased by a step length ranging from 6 dB to 24 dB.

* * * * *